US009188089B2

(12) United States Patent
Mitsuda et al.

(10) Patent No.: US 9,188,089 B2
(45) Date of Patent: Nov. 17, 2015

(54) ENGINE APPARATUS

(71) Applicant: YANMAR CO., LTD., Osaka (JP)

(72) Inventors: Masataka Mitsuda, Osaka (JP); Kenta Saitou, Osaka (JP); Takayuki Onodera, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/368,963

(22) PCT Filed: Dec. 26, 2012

(86) PCT No.: PCT/JP2012/083716
§ 371 (c)(1),
(2) Date: Jun. 26, 2014

(87) PCT Pub. No.: WO2013/099980
PCT Pub. Date: Jul. 4, 2013

(65) Prior Publication Data
US 2014/0366516 A1  Dec. 18, 2014

(30) Foreign Application Priority Data

Dec. 27, 2011  (JP) ................................. 2011-286236
Jan. 19, 2012  (JP) ................................. 2012-008948

(51) Int. Cl.
*F01N 13/10* (2010.01)
*F02M 25/07* (2006.01)
(Continued)

(52) U.S. Cl.
CPC ........... *F02M 25/077* (2013.01); *F01N 13/008* (2013.01); *F01N 13/08* (2013.01); *F01N 13/082* (2013.01); *F01N 13/10* (2013.01); *F02M 25/07* (2013.01); *F02M 25/0726* (2013.01); *F02M 25/0747* (2013.01); *F02M 25/0753* (2013.01);

(Continued)

(58) Field of Classification Search
CPC ........... F01N 1/08; F01N 1/18; F01N 3/2892;
F01N 13/008; F01N 13/10; F01N 13/1805;
F01N 2240/02; F01N 2260/04; F01N 2260/14;
F01N 2340/04; F01N 2560/08; F01N 2590/08;
F02M 25/0703; F02M 25/0717; F02M
25/0735; F02M 25/0737; F02M 25/0747
USPC .................... 60/278, 300, 320, 322, 323, 324
See application file for complete search history.

(56) References Cited

U.S. PATENT DOCUMENTS 3,941,113 A * 3/1976 Baguelin .................... 123/179.1
4,254,752 A * 3/1981 Friddell et al. ................ 123/323
(Continued)

FOREIGN PATENT DOCUMENTS

| JP | 3-023306 | 1/1991 |
|---|---|---|
| JP | 2009-097335 | 5/2009 |
| JP | 2009-209878 | 9/2009 |
| JP | 2010-185340 | 8/2010 |
| JP | 2010-185403 | 8/2010 |
| JP | 2010185340 A * | 8/2010 |
| JP | 2010-203393 | 9/2010 |
| JP | 2011-017256 | 1/2011 |
| WO | WO-2010/073353 | 7/2010 |

*Primary Examiner* — Jason Shanske
*Assistant Examiner* — Jorge Leon, Jr.
(74) *Attorney, Agent, or Firm* — Jordan and Hamburg LLP

(57) ABSTRACT

Provided is an engine apparatus that ensures highly accurate adjustment of the exhaust gas pressure of an exhaust manifold while providing an exhaust gas throttle device with a support structure of increased rigidity. The engine apparatus includes: an engine including the exhaust manifold; and the exhaust gas throttle device to adjust an exhaust gas pressure of the exhaust manifold. An exhaust gas intake side of a throttle valve easing of the exhaust gas throttle device is fastened to an exhaust gas exit of the exhaust manifold. An exhaust pipe is coupled to the exhaust manifold through the throttle valve casing.

4 Claims, 14 Drawing Sheets

(51) Int. Cl.
| | | |
|---|---|---|
| *F01N 13/00* | (2010.01) | |
| *F01N 13/08* | (2010.01) | |
| *F01N 1/18* | (2006.01) | |
| *F01N 13/18* | (2010.01) | |
| *F01N 1/08* | (2006.01) | |
| *F01N 3/28* | (2006.01) | |

(52) U.S. Cl.
CPC ... *F01N 1/08* (2013.01); *F01N 1/18* (2013.01); *F01N 3/2892* (2013.01); *F01N 13/1805* (2013.01); *F01N 2240/02* (2013.01); *F01N 2240/36* (2013.01); *F01N 2260/024* (2013.01); *F01N 2260/04* (2013.01); *F01N 2260/14* (2013.01); *F01N 2340/04* (2013.01); *F01N 2560/08* (2013.01); *F01N 2590/08* (2013.01); *F02M 25/0703* (2013.01); *F02M 25/0717* (2013.01); *F02M 25/0735* (2013.01); *F02M 25/0737* (2013.01)

(56) References Cited

U.S. PATENT DOCUMENTS

| | | | | |
|---|---|---|---|---|
| 8,302,385 | B2 * | 11/2012 | Sujan | 60/295 |
| 8,893,479 | B2 * | 11/2014 | Togashi et al. | 60/295 |
| 2003/0110761 | A1 * | 6/2003 | Minami | 60/280 |
| 2009/0094978 | A1 | 4/2009 | Yamagata et al. | |
| 2009/0266060 | A1 * | 10/2009 | Guo et al. | 60/295 |
| 2010/0206265 | A1 * | 8/2010 | Yamagata et al. | 123/337 |
| 2011/0030342 | A1 * | 2/2011 | Herges | 60/273 |
| 2011/0040476 | A1 | 2/2011 | Ogawa et al. | |
| 2012/0180463 | A1 * | 7/2012 | Oohashi et al. | 60/297 |

* cited by examiner

ENGINE APPARATUS

TECHNICAL FIELD

The present invention relates to engine apparatuses such as diesel engines to be built in working vehicles such as skid steer loaders, backhoes, and forklift trucks, in agricultural machines such as tractors and combines, and in fixed electric generators or refrigerators. More specifically, the present invention relates to an engine apparatus having an exhaust manifold.

BACKGROUND OF THE INVENTION

Conventionally, technology has been developed in that an exhaust gas purifier (diesel particulate filter) is disposed in an exhaust gas flow path of an engine. The exhaust gas purifier includes an oxidation catalyst, a soot filter, and other elements that to perform purification treatment of exhaust gas discharged from a diesel engine (see, for example, patent document 1).

A conventionally known exhaust gas throttle device has been disposed in the exhaust gas flow path. This prevents a drop in a temperature of exhaust gas discharged to the exhaust gas purifier, thereby sustaining purifying capability of the exhaust gas purifier.

Conventionally, technology has been developed in that an EGR device is disposed in the exhaust gas flow path to discharge exhaust gas from the diesel engine.

An EGR cooler for cooling EGR gas is disposed in the exhaust gas flow path of the conventionally known engine. This causes a part of exhaust gas discharged from the engine to the exhaust manifold to be recirculated to the engine through an intake manifold, thereby minimizing the amount of emission of NOx (nitrogen oxide) of the engine. Further, an exhaust gas throttle valve is disposed to increase a pressure of exhaust gas of the engine, and the exhaust gas throttle valve increases the pressure of exhaust gas from the engine, thereby raising the temperature of exhaust gas discharged from the engine. This ensures a necessary temperature of exhaust gas for the exhaust gas purifier (such as the soot filter) to oxidize particulate matters (PM) collected from exhaust gas for removal.

RELATED ART DOCUMENTS

Patent Documents

Patent document 1: Japanese Unexamined Patent Application Publication No. 2010-185340, As disclosed in patent document 1, even if the exhaust gas purifier is assembled to the engine while keeping a distance from the engine, the temperature of exhaust gas supplied from the engine to the exhaust gas purifier can be maintained so as to prevent the occurrence of incomplete regeneration of the soot filter of the exhaust gas purifier. However, with a structure in which the throttle valve casing is coupled to the exhaust manifold through a relay pipe, it becomes difficult to simply reduce the volume of an exhaust gas intake side of the exhaust gas purifier. In addition, an exhaust gas pipe, through which the exhaust gas throttle device is coupled to the exhaust gas purifier, is problematic in that the extending direction of the exhaust gas pipe is specified.

With a structure in which the exhaust gas throttle device to adjust the exhaust gas pressure of the engine is disposed on an exit portion of the exhaust manifold 71 as disclosed in patent document 1, further, the exhaust gas pressure sensor is disposed to detect an exhaust gas pressure at the exhaust manifold. In this case, an exhaust gas pressure sensor is coupled to the exhaust manifold by an exhaust gas pressure sensor pipe. If the distance between a pressure take-out port of the exhaust manifold and the exhaust gas pressure sensor is short, then, this results in heat-up of a coupling component such as a flexible rubber hose with which the exhaust gas pressure sensor and the exhaust gas pressure sensor pipe are coupled to each other. This presents a problem in that it is difficult to improve durability of the coupling component such as the flexible rubber hose. In contrast, if the distance between the pressure take-out port of the exhaust manifold and the exhaust gas pressure sensor is long, then, an increased likelihood occurs for the coupling components such as the exhaust gas pressure sensor pipe or the rubber hose to easily vibrate. This presents a problem in that it is difficult to simplify a vibration-proof structure of the coupling components such as the exhaust gas pressure sensor pipe or the rubber hose.

SUMMARY OF THE INVENTION

Therefore, the present invention has an object to provide an improved engine apparatus in consideration of the above circumstances.

To achieve the above object, an engine according to the present invention includes an exhaust manifold and an exhaust gas throttle device configured to adjust an exhaust gas pressure of the exhaust manifold. An exhaust gas intake side of a throttle valve casing of the exhaust gas throttle device is fastened to an exhaust gas exit of the exhaust manifold, and an exhaust pipe is coupled to the exhaust manifold through the throttle valve casing.

In the engine apparatus, the throttle valve casing may be coupled to an upper surface side of the exhaust manifold. A relay pipe may be coupled an upper surface side of the throttle valve casing. The throttle valve casing and the relay pipe may be placed in multiple layers with respect to the exhaust manifold. The exhaust pipe may be coupled to the relay pipe at the uppermost layer portion.

In the engine apparatus, the exhaust gas exit of the exhaust manifold may be open upward, the throttle valve casing may be disposed on the upper surface side of the throttle valve casing. The upper surface side of the throttle valve casing may be formed with a throttle valve gas exit, and the EGR cooler configured to cool EGG gas may be disposed below the throttle valve casing across the exhaust manifold.

In the engine apparatus, the engine apparatus may further include an exhaust gas pressure sensor configured to detect the exhaust gas pressure at the exhaust manifold, and a heat-conducting exhaust gas pressure sensor pipe configured to couple the exhaust gas pressure sensor to the exhaust manifold. A cooling water pump through which a cooling water is circulated to the EGR cooler may be disposed in parallel to the exhaust gas pressure sensor pipe.

In the engine apparatus, a pipe supporting bracket may be secured to the exhaust manifold, and the cooling water pipe and the exhaust gas pressure sensor pipe may be secured to the pipe supporting bracket.

In the engine apparatus, an EGR gas take-out pipe may be integrally formed with the exhaust manifold such that the EGR gas take-out pipe protrudes obliquely downward in the outward direction from the exhaust manifold. One end of the EGR cooler may be coupled to a protruding end portion of the EGR gas take-out pipe. The other end of the EGR cooler may have a pipe joint member. The other end of the EGR cooler may be coupled to the exhaust manifold through the pipe joint member. The cooling water pipe may extend above the EGR cooler at an outside of the exhaust manifold.

Effects of the Invention

With the present invention, an engine apparatus includes an engine including an exhaust manifold and is configured in that an exhaust gas throttle device adjusts a pressure of exhaust gas of the exhaust manifold. In the engine apparatus, an exhaust gas intake side of a throttle valve casing of the exhaust gas throttle device is fastened to an exhaust gas exit of the exhaust manifold such that an exhaust pipe is coupled to the exhaust manifold through the throttle valve easing. This ensures that the exhaust gas throttle device is supported on the exhaust manifold with increased rigidity, and thus the support structure of the exhaust gas throttle device has high rigidity. At the same time, the volume of the exhaust gas intake side of the exhaust gas throttle device is reduced, which ensures highly accurate adjustment of the exhaust gas pressure of the exhaust manifold as compared with, for example, a structure in which the throttle valve casing is coupled to the exhaust manifold through the relay pipe. For example, the temperature of exhaust gas supplied to the exhaust gas purifier is readily maintained at a proper temperature for purification of exhaust gas.

With the present invention, the throttle valve casing is fastened to the top surface side of the exhaust manifold, and the relay pipe is fastened to the top surface side of the throttle valve casing. The throttle valve casing and the relay pipe are disposed in multiple layers with respect to the exhaust manifold, and the exhaust pipe is coupled to the relay pipe at the uppermost layer portion. This makes the mounting posture of the relay pipe (the coupling direction of the exhaust pipe) variable in association with, for example, the mounting position of the exhaust gas purifier without changing a supporting posture of the exhaust gas throttle device nor changing the specifications of the relay pipe.

With the present invention, the exhaust manifold includes an exhaust gas exit open upward, and the throttle valve casing is disposed on the top surface side of the exhaust manifold. The throttle valve gas exit is formed on the top surface side of the throttle valve casing, and the EGR cooler is disposed below the throttle valve casing across the exhaust manifold. Thus, the exhaust manifold, the exhaust gas throttle device, and the EGR cooler are positioned in a compact manner along one side surface of the diesel engine. At the same time, the exhaust pipe is laterally or upwardly extendable from a throttle valve gas exit of the throttle valve casing in association with, for example, the layout of the exhaust gas purifier. Moreover, utilizing the outer side surface of the exhaust manifold compact support of a cooling water tubing coupled to the exhaust gas throttle device and the EGR cooler.

With the present invention, the engine apparatus further includes an exhaust gas pressure sensor to detect the exhaust gas pressure at the exhaust manifold, and a heat-conducting exhaust gas pressure sensor pipe through which the exhaust gas pressure sensor is coupled to the exhaust manifold. The exhaust gas pressure sensor pipe is disposed in parallel to a cooling water pipe through which cooling water is recirculated to the EGR cooler. With the cooling water pipe and the exhaust gas pressure sensor pipe arranged in parallel, this suppresses an increase in the temperature of the exhaust gas pressure sensor pipe, which is subject to heat of exhaust gas. This improves durability of a connection part such as a flexible rubber hose. At the same time, the exhaust gas pressure sensor is placed adjacent to the pressure take-out port of the exhaust manifold, and the exhaust gas pressure sensor pipe is shortened in length. This simplifies the shock-proofing structure of the exhaust gas pressure sensor pipe or the connection parts.

With the present invention, a pipe supporting bracket is secured to the exhaust manifold, and the intermediate pipe and the exhaust gas pressure sensor pipe are secured to the pipe supporting bracket. Thus, the cooling water pipe, the exhaust gas pressure sensor pipe, and the pipe supporting bracket are formed into a single component to be assembled to the diesel engine. At the same time, the cooling water pipe and the exhaust gas pressure sensor pipe are firmly secured to the exhaust manifold of increased rigidity through the pipe supporting bracket through the pipe supporting bracket. This simplifies the vibration-proof structure of the cooling water pipe and the exhaust gas pressure sensor pipe.

With the present invention, an EGR gas take-out pipe is integrally formed with the exhaust manifold, and the EGR gas take-out pipe protrudes obliquely downward in the outward direction from the exhaust manifold. One side portion of the EGR cooler is coupled to a protruding end of the EGR gas take-out pipe, and a pipe joint member is formed on the other side of the EGR cooler. The other side portion of the EGR cooler is coupled to the exhaust manifold through the pipe joint member, and the cooling water pipe extends upward of the EGR cooler in an area outside the exhaust manifold. This reduces the number of supporting parts supporting the EGR cooler at a distance from the side surface of the diesel engine, resulting in a reduction in production cost. At the same time, the cooling water pipe extends adjacent to the pressure take-out port (at the mounting position of the exhaust gas pressure sensor pipe) of the exhaust manifold. For example, the water cooling pipe or the exhaust gas pressure sensor pipe is supported in an area further inward than the outer side surface of the EGR cooler. Thus, no likelihood occurs for the water cooling pipe or the exhaust gas pressure sensor pipe to protrude far from the side surface of the engine. The water cooling pipe or the exhaust gas pressure sensor pipe is positioned adjacent to the side surface of the engine in a compact manner.

DETAILED DESCRIPTION OF THE PREFERRED EMBODIMENTS

Figure 1:
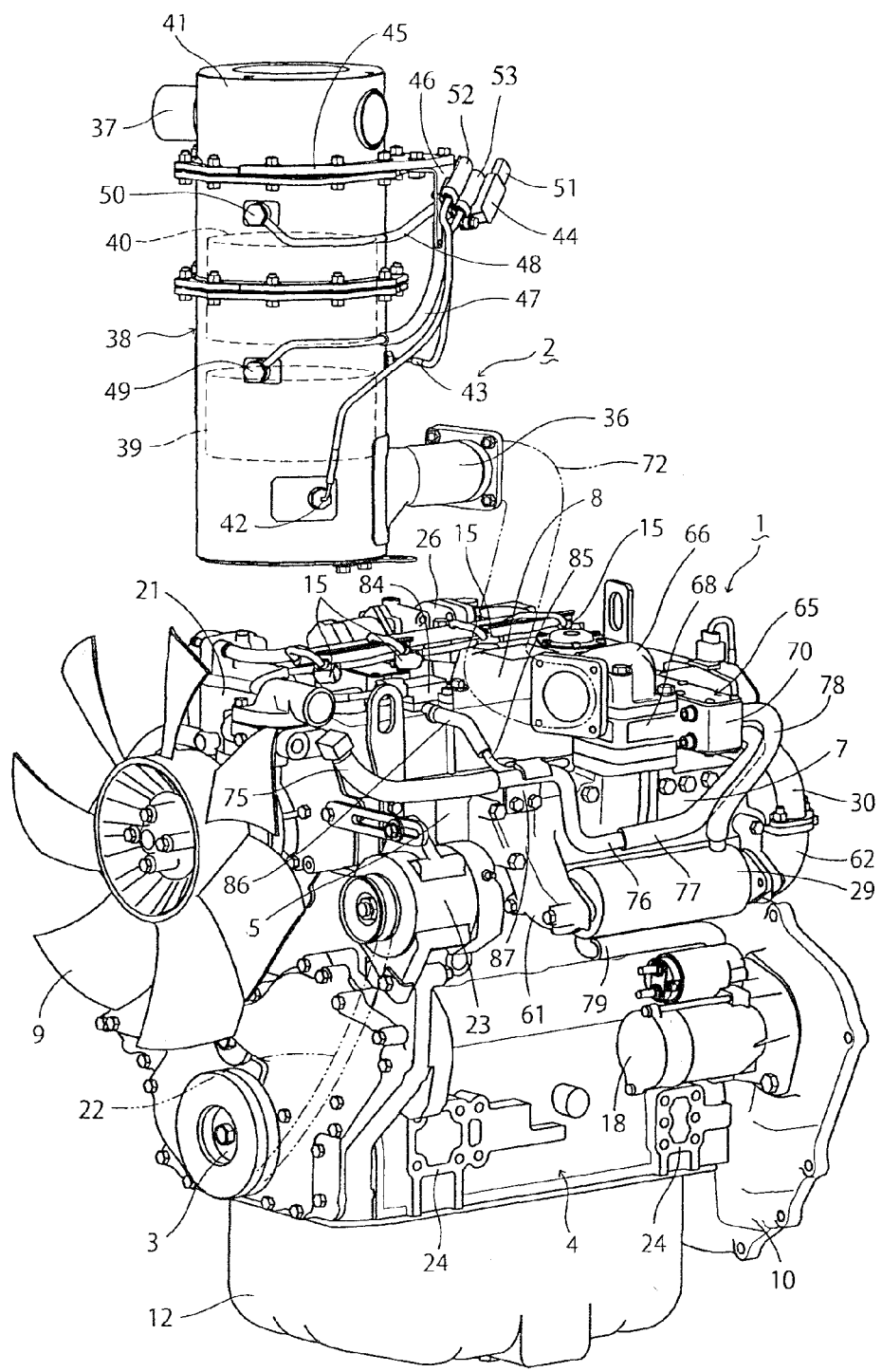
FIG. 1 is a perspective view of a diesel engine according to a first embodiment of the present invention.
Figure 2:
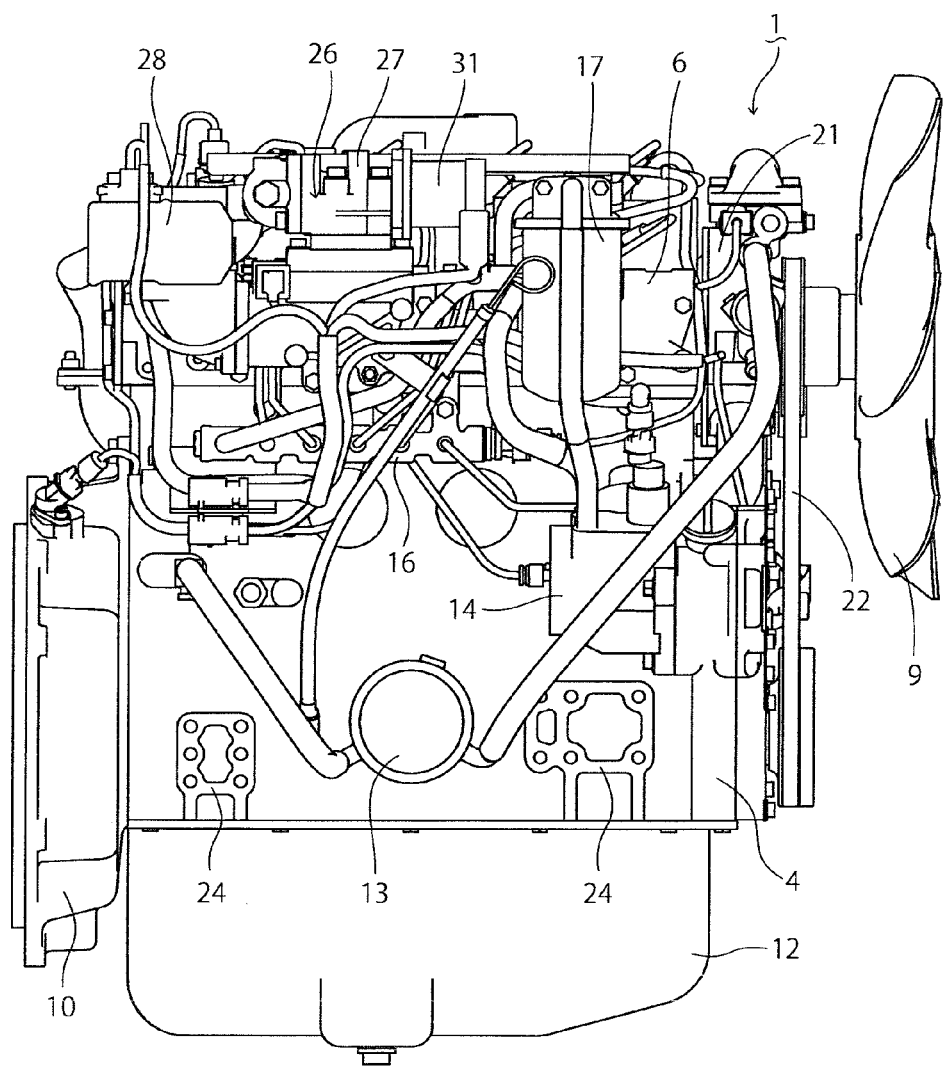
FIG. 2 is a front view of the diesel engine.
Figure 3:
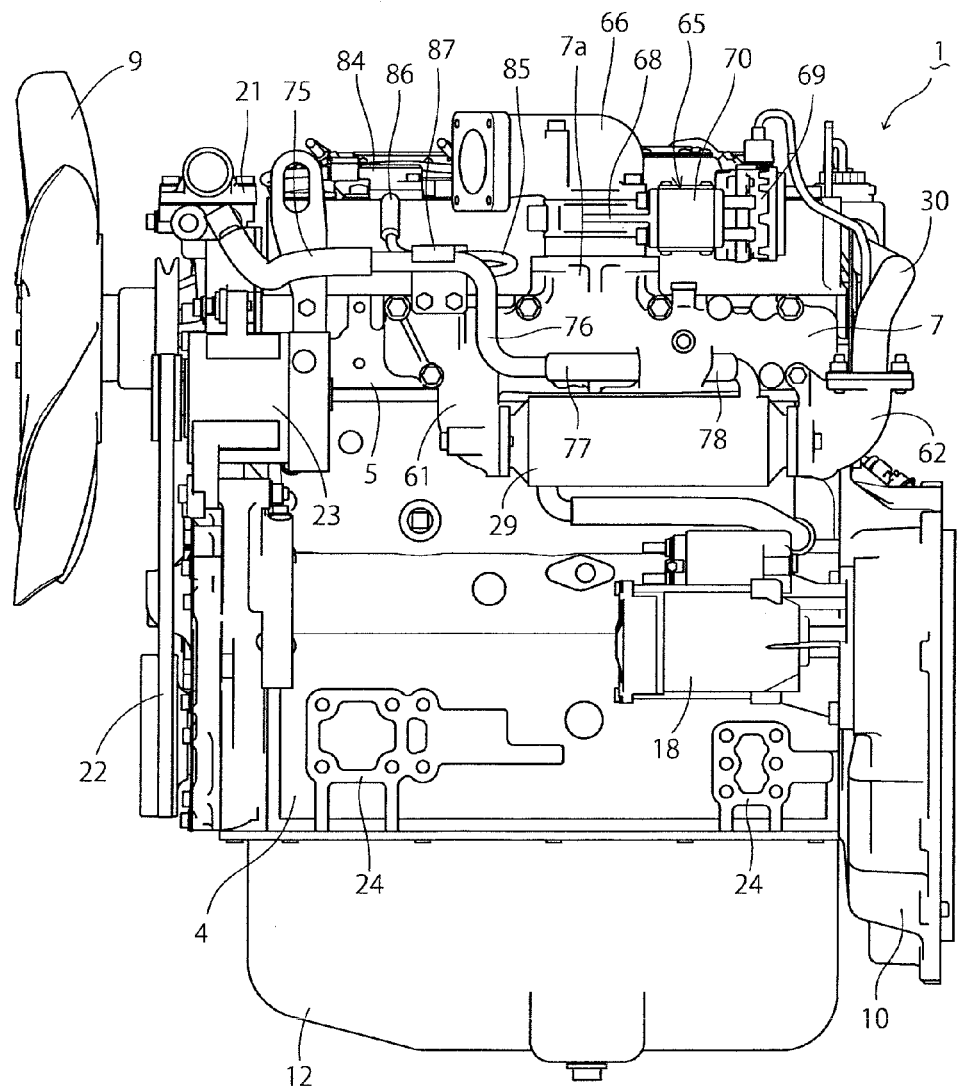
FIG. 3 is a rear view of the diesel engine.
Figure 4:
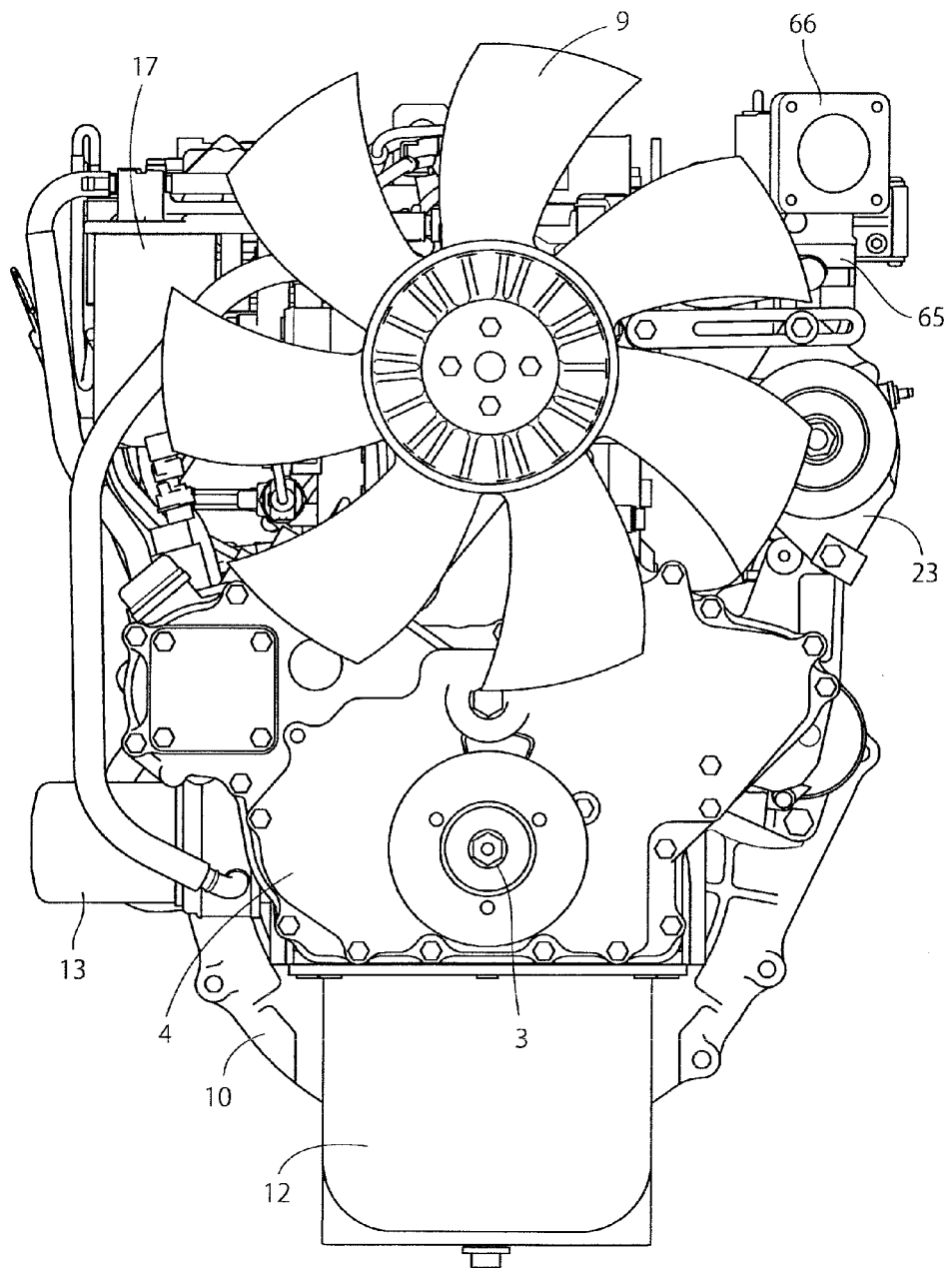
FIG. 4 is a right side view of the diesel engine.
Figure 5:
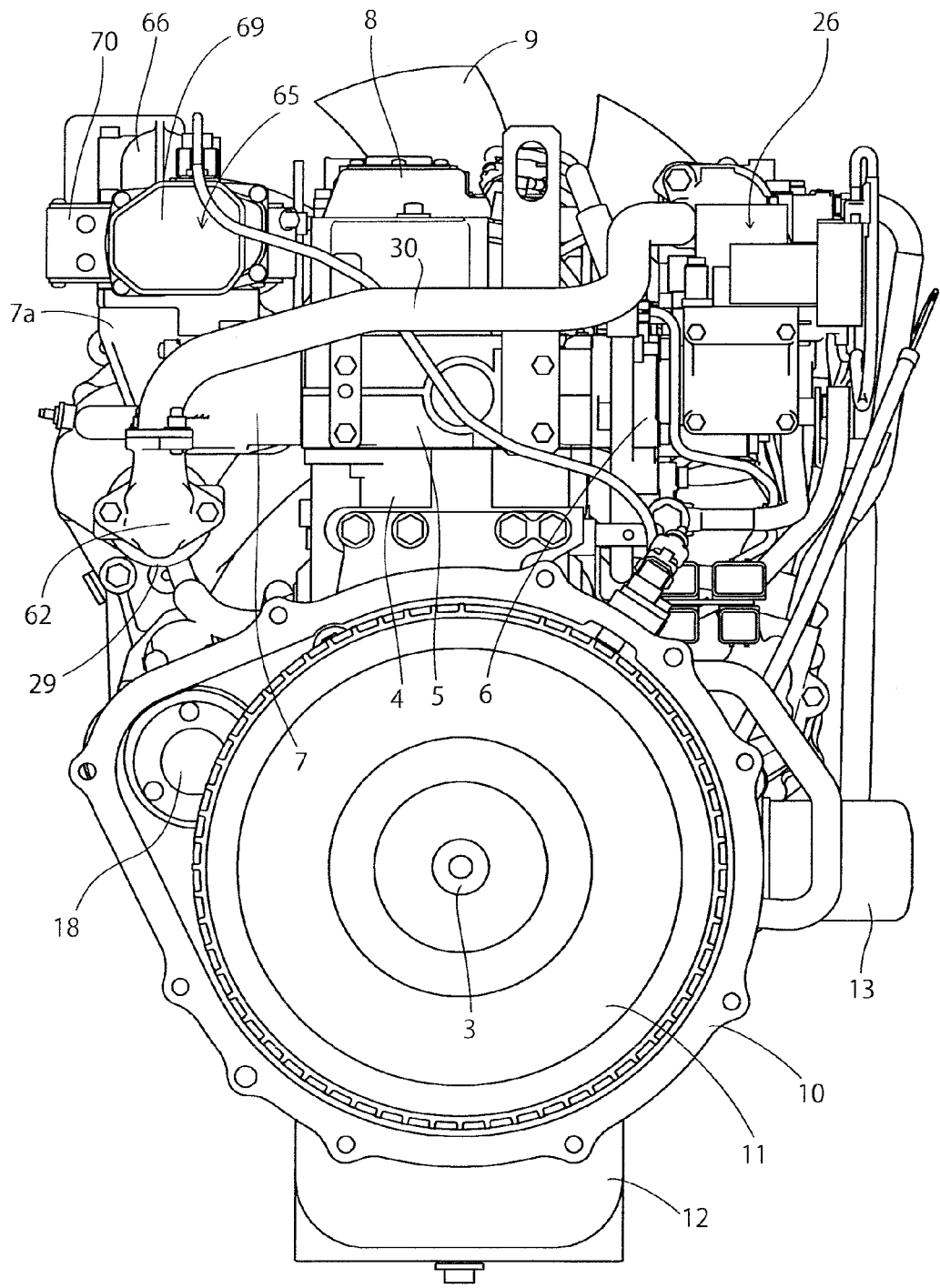
FIG. 5 is a left side view of the diesel engine.
Figure 6:
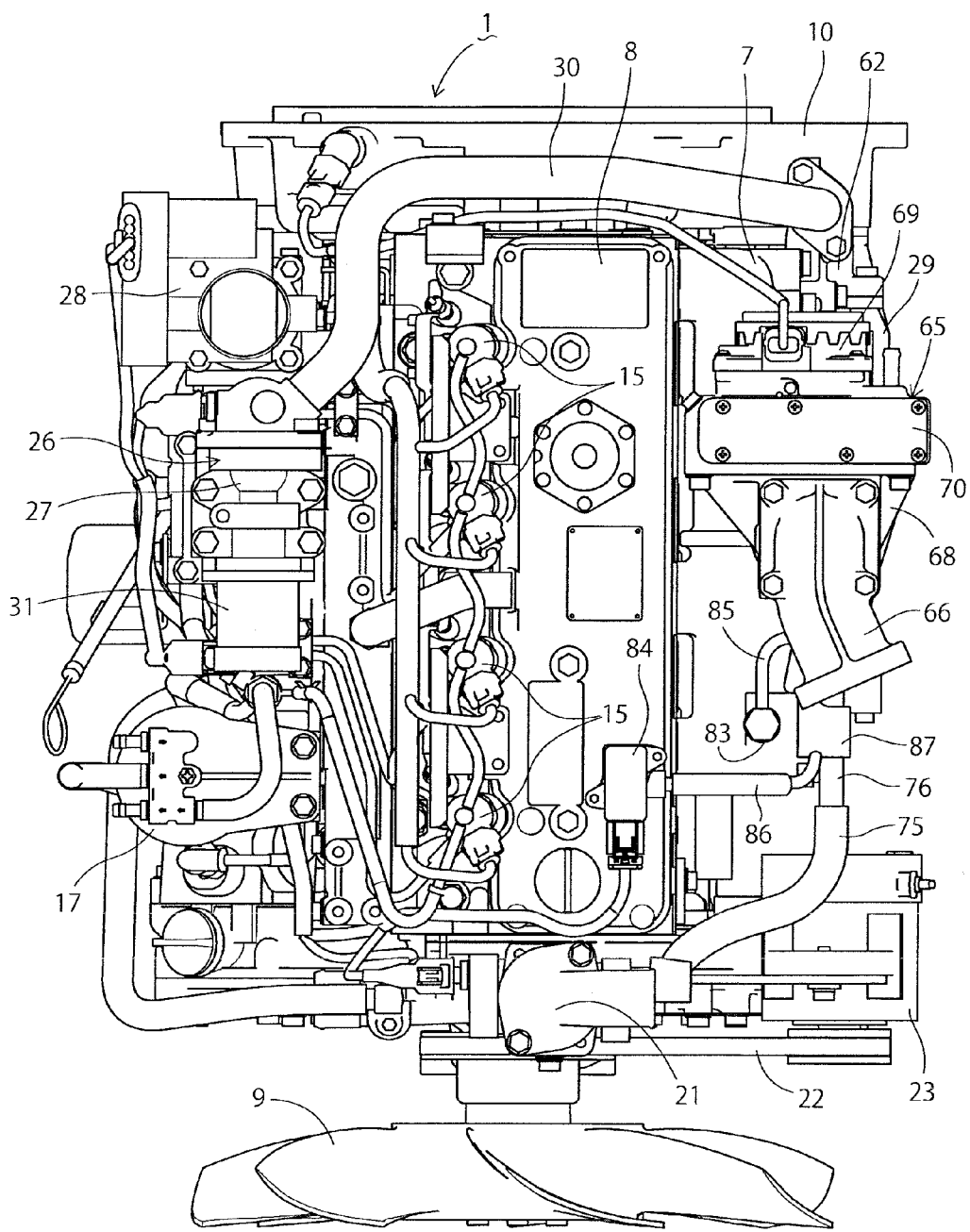
FIG. 6 is a plan view of the diesel engine.
Figure 7:
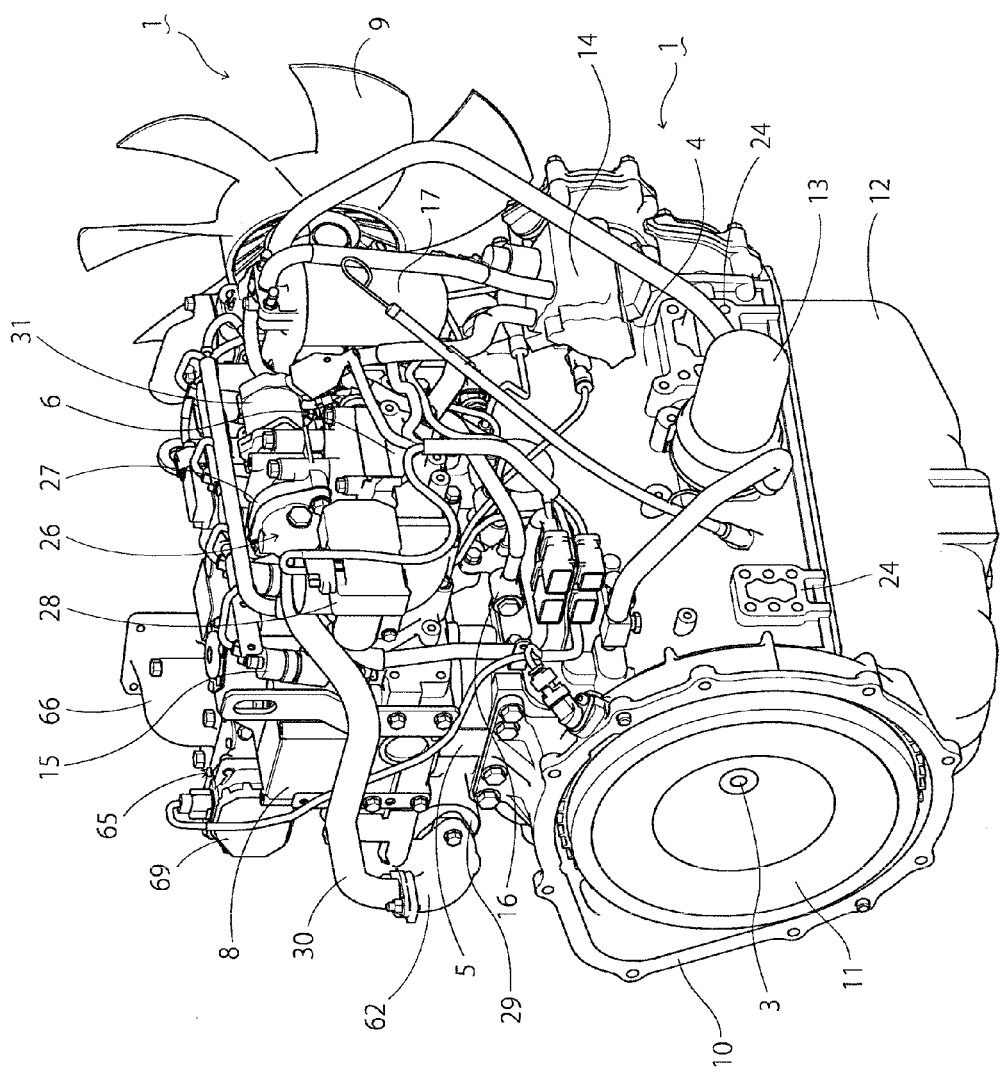
FIG. 7 is a perspective view of the diesel engine as viewed in a left side.

Referring to FIGS. 1 to 14, an embodiment of an engine apparatus according to the present invention will be described below with reference to the drawings. A diesel engine 1 is disposed as a prime mover in a construction machine, a civil engineering machine, an agricultural machine, or a cargo-handling machine. In the diesel engine 1, an exhaust gas purifier 2 (diesel particulate filter) of continuous regeneration type is disposed. The exhaust gas purifier 2 removes particulate matter (PM) contained in exhaust gas of the diesel engine 1, and in addition, reduces carbon monoxide (CO) and hydrocarbon (HC) contained in the exhaust gas of the diesel engine 1.

The diesel engine 1 includes a cylinder block 4, which includes an engine output crank shaft 3 and a piston (not shown). Over the cylinder block 4, a cylinder head 5 is disposed. On a right side surface of the cylinder head 5, an intake manifold 6 is disposed. On a left side surface of the cylinder head 5, an exhaust manifold 7 is disposed. On a top surface side surface of the cylinder head 5, a head cover 8 is disposed. On a front side surface of the cylinder block 4, a cooling fan 9 is disposed. On a rear side surface of the cylinder block 4, a flywheel housing 10 is disposed. In the flywheel housing 10, a flywheel 11 is disposed.

The flywheel 11 is axially supported on the crank shaft 3 (engine output shaft). The power of the diesel engine 1 is retrieved to an operation unit of a working vehicle (such as a backhoe and a forklift) through the crank shaft 3. On a lower surface of the cylinder block 4, an oil pan 12 is disposed. Lubricant in the oil pan 12 is supplied to lubrication parts of the diesel engine 1 through an oil filter 13, which is disposed on a side surface of the cylinder block 4.

On the side surface of the cylinder block 4 that is above the oil filter 13 (below the intake manifold 6), a fuel supply pump 14 is mounted. Through the fuel supply pump 14, fuel is supplied. The diesel engine 1 is provided with injectors 15 for four cylinders. The injectors 15 each have a fuel injection valve (not shown) of electromagnetic on-off control type. Through the fuel supply pump 14, a hollow cylindrical common rail 16, and a fuel filter 17, the injectors 15 are each connected with a fuel tank (not shown) disposed in the working vehicle.

The fuel in the fuel tank is sent under pressure from the fuel supply pump 14 to the common rail 16 through the fuel filter 17, so that the fuel is stored in the common rail 16 under high pressure. The fuel injection valve of each of the injectors 15 is on-off controlled so that the injectors 15 inject the high pressure fuel in the common rail 16 to the cylinders of the diesel engine 1.

At a left side part on the front surface of the cylinder block 4, a cooling water pump 21 for cooling water lubrication is disposed. The cooling water pump 21 is coaxial to the fan axis of the cooling fan 9. By the rotation of the crank shaft 3, the cooling fan 9 together with the cooling water pump 21 is driven through a cooling fan drive V belt 22. The working vehicle is provided with a radiator (not shown), which contains cooling water. By the driving of the cooling water pump 21, the cooling water is supplied to the cooling water pump 21. Then, the cooling water is supplied to the cylinder block 4 and the cylinder head 5, and thus the diesel engine 1 is cooled. On the left side of the cooling water pump 21, an alternator 23 is disposed.

On each of left and right side surfaces of the cylinder block 4, an engine leg mounting portion 24 is disposed. To each engine leg mounting portion 24, an engine leg (not shown) provided with a rubber vibration isolator is fastened using a bolt. Through each engine leg, the diesel engine 1 is supported on the working vehicle (on an engine mounting chassis of a backhoe, a fork lift, or another working vehicle) in a vibration preventing manner.

Further, an EGR device 26 (exhaust gas recirculation device) will be described. To an inlet of the intake manifold 6, which protrudes upward, an air cleaner (not shown) is coupled through the EGR device 26 (exhaust gas recirculation device). From the air cleaner, new air (external air) is sent to the intake manifold 6 through the EGR device 26.

The EGR device 26 includes: an EGR body casing 27 (collector), which mixes part of the exhaust gas (EGR gas from the exhaust manifold) from the diesel engine with new air (external air from the air cleaner), and supplies the resulting air to the intake manifold 6; an intake throttle member 28, which couples the EGR body casing 27 to the air cleaner; a recirculation exhaust gas pipe 30, which is coupled to the exhaust manifold 7 through an EGR cooler 29 to serve as a reflux pipe conduit; and an EGR valve member 31, which couples the EGR body casing 27 to the recirculation exhaust gas pipe 30.

That is, the intake manifold 6 is coupled to the intake throttle member 28, which is for new air introduction, through the EGR body casing 27. To the EGR body casing 27, an exit end of the recirculation exhaust gas pipe 30, which extends from the exhaust manifold 7, is coupled. The EGR body casing 27 is formed in an elongated cylindrical shape. The intake throttle member 28 is fastened using a bolt to one longitudinal end of the EGR body casing 27. The downward opening of the EGR body casing 27 is fastened using a bolt to the inlet of the intake manifold 6 in an attachable and detachable manner.

The exit end of the recirculation exhaust gas pipe 30 is coupled to the EGR body casing 27 through the EGR valve member 31. An intake side of the recirculation exhaust gas pipe 30 is coupled to a lower surface side of the exhaust manifold 7 through the EGR cooler 29. By adjusting the opening degree of an EGR valve (not shown) in the EGR valve member 31, the amount of EGR gas supply to the EGR body casing 27 is adjusted.

The above-described configuration ensures that new air (external air) is supplied to the inside of the EGR body casing 27 from the air cleaner through the intake throttle member 28, while EGR gas (part of the exhaust gas discharged from the exhaust manifold) is supplied to the inside of the EGR body casing 27 from the exhaust manifold 7 through the EGR valve member 31. The new air from the air cleaner and the EGR gas from the exhaust manifold 7 are mixed together in the EGR body casing 27, and then the mixture gas in the EGR body casing 27 is supplied to the intake manifold 6. That is, part of the exhaust gas discharged from the diesel engine 1 to the exhaust manifold 7 is made to flow back to the diesel engine 1 through the intake manifold 6. This decreases the maximum combustion temperature at the time of high-load driving, and reduces the amount of NOx (nitrogen oxide) exhaust from the diesel engine 1.

Next, the exhaust gas purifier 2 will be described by referring to FIGS. 1 and 11. The exhaust gas purifier 2 includes an exhaust gas purification casing 38, which includes a purification inlet pipe 36 and a purification outlet pipe 37. The exhaust gas purification casing 38 incorporates: a diesel oxidation catalyst 39 (gas purifier), which generates nitrogen dioxide (NO2) and is made of platinum or another material; and a soot filter 40 (gas purifier) of honeycomb structure, which continuously oxidizes and removes collected particulate matter (PM) at comparatively low temperature. The diesel oxidation catalyst 39 and the soot filter 40 are arranged in series in the direction of movement of the exhaust gas (from downward to upward in FIG. 1). At one side portion of the exhaust gas purification casing 38, a muffler 41 is formed. At the muffler 41, the purification outlet pipe 37 is disposed.

The above-described configuration ensures that nitrogen dioxide (NO2) generated by oxidation effected by the diesel oxidation catalyst 39 is supplied to the inside of the soot filter 40 from one side end surface (intake side end surface). The particulate matter (PM) contained in the exhaust gas of the diesel engine 1 is collected by the soot filter 40, where the particulate matter (PM) is continuously oxidized and removed by the nitrogen dioxide (NO2). In addition to the removal of the particulate matter (PM) in the exhaust gas of the diesel engine 1, the content of carbon monoxide (CO) and the content of hydrocarbon (HC) in the exhaust gas of the diesel engine 1 are reduced.

An upstream-side gas temperature sensor 42 and a downstream-side gas temperature sensor 43, which are each in the form of a thermister, are attached to the exhaust gas purification casing 38. The upstream-side gas temperature sensor 42 detects an exhaust gas temperature at a gas inflow side end surface of the diesel oxidation catalyst 39. The downstream-side gas temperature sensor 43 detects an exhaust gas temperature at a gas outflow side end surface of the diesel oxidation catalyst.

Further to the exhaust gas purification casing 38, a differential pressure sensor 44, which serves as an exhaust gas pressure sensor, is attached. The differential pressure sensor 44 detects a pressure difference in the exhaust gas between the upstream side and the downstream side of the soot filter 40. Based on the exhaust pressure difference between the upstream side and the downstream side of the soot filter 40, the accumulated amount of the particulate matter in the soot filter 40 is calculated, and this provides a grasp of the state of clogging in the soot filter 40.

Figure 11:
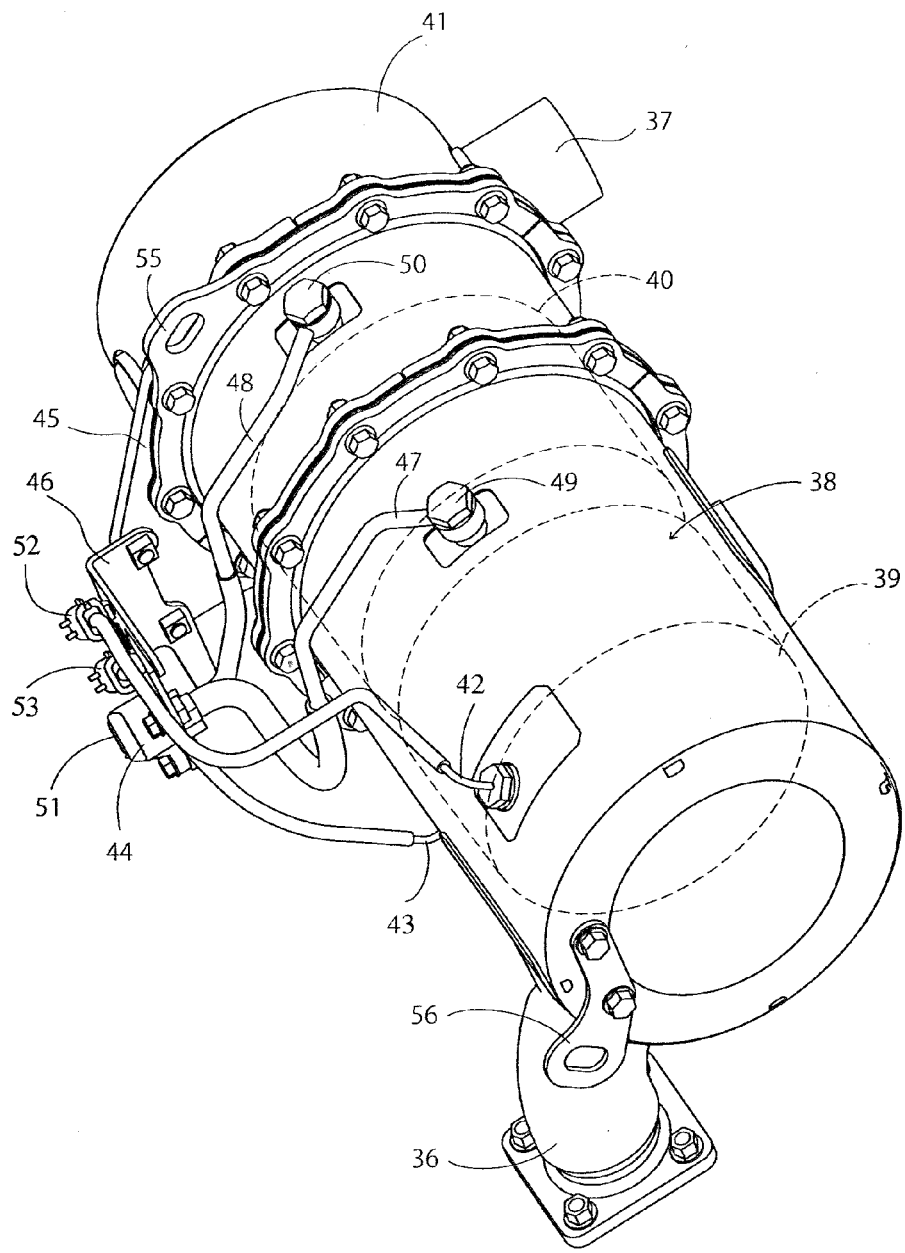
FIG. 11 is an external and perspective view of an exhaust gas purifier.
Figure 12:
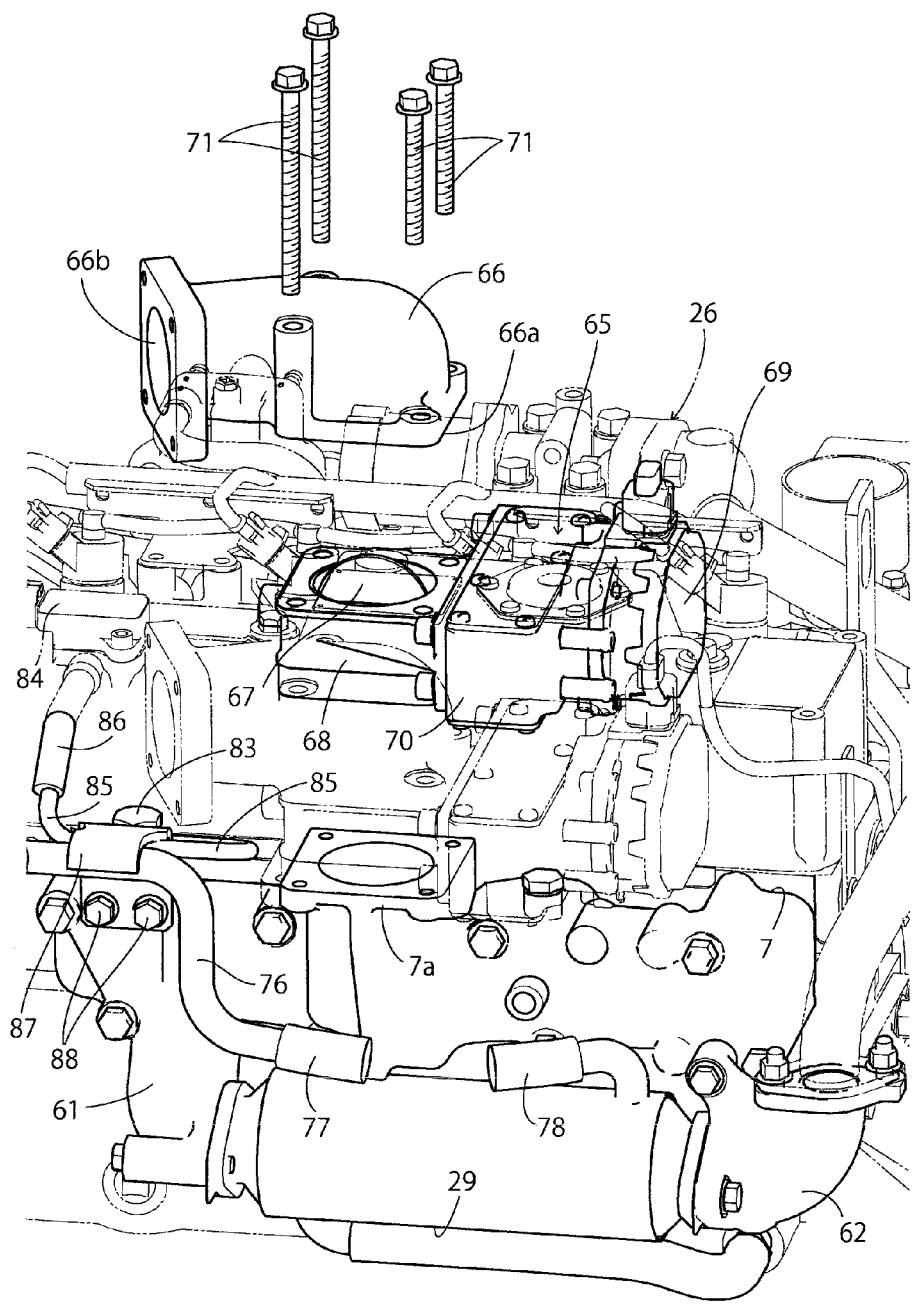
FIG. 12 is an exploded perspective view of an exhaust gas throttle device.
Figure 13:
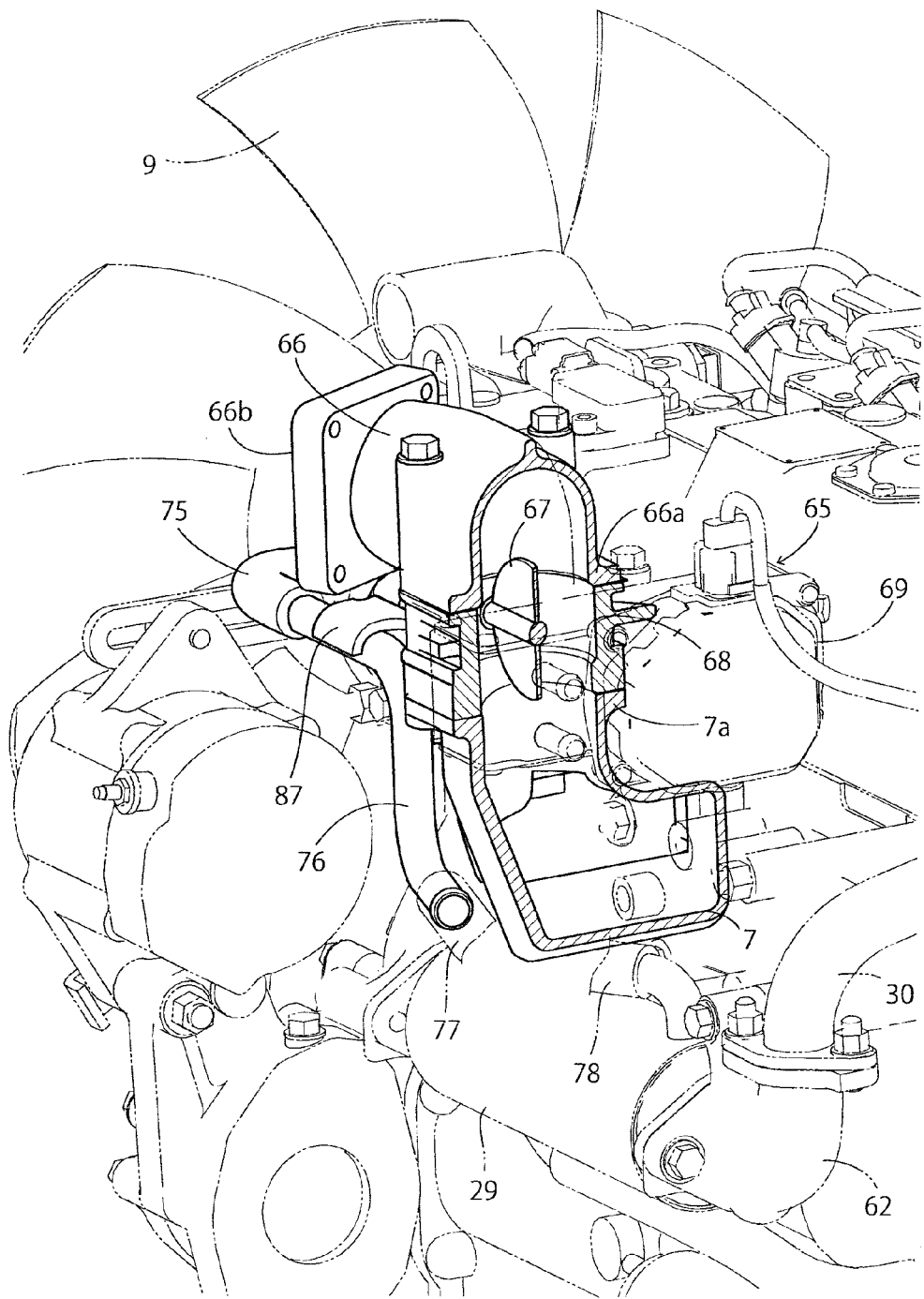
FIG. 13 is a longitudinal sectional view of the exhaust gas throttle device.
Figure 14:
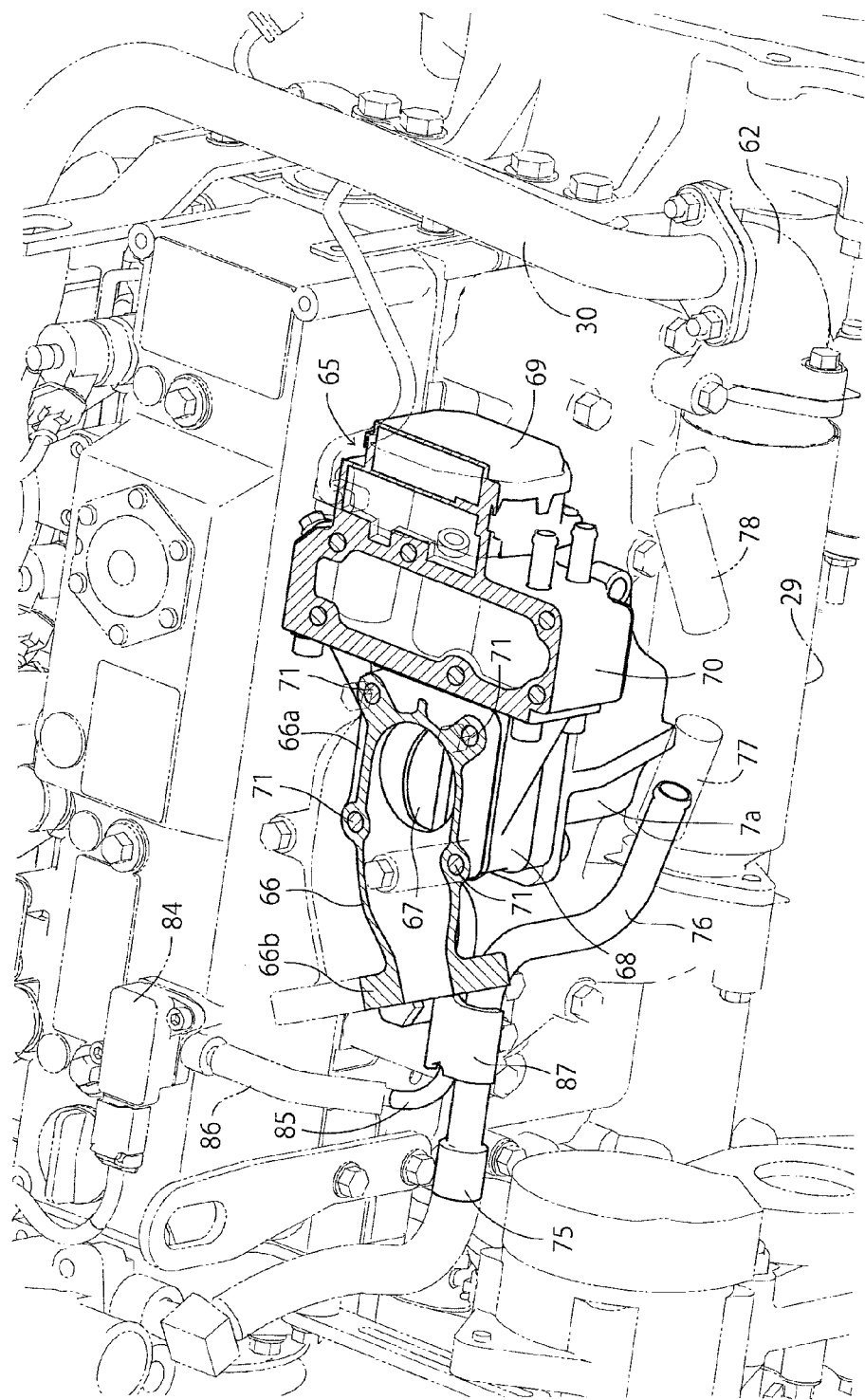
FIG. 14 is a cross-sectional view of the exhaust gas throttle device.

As shown in FIGS. 1 and 11, a sensor bracket 46 is fastened to an exit holding flange 45 of the exhaust gas purification casing 38 using a bolt, and thus the sensor bracket 46 is disposed on an outer surface side of the exhaust gas purification casing 38. To the sensor bracket 46, the differential pressure sensor 44, which includes an integral electrical wiring connector, is mounted. On the outer side surface of the exhaust gas purification casing 38, the differential pressure sensor 44 is disposed. To the differential pressure sensor 44, one end side of an upstream-side sensor piping 47 and one end side of a downstream-side sensor piping 48 are coupled. Sensor piping boss bodies 49 and 50, which are respectively on the upstream side and the downstream side, are disposed on the exhaust gas purification casing 38 as if to hold the soot filter 40 in the exhaust gas purification casing 38 between the sensor piping boss bodies 49 and 50. Another end side of the upstream-side sensor piping 47 and another end side of the downstream-side sensor piping 48 are respectively coupled to the sensor piping boss bodies 49 and 50.

The above-described configuration ensures that a difference (differential pressure of the exhaust gas) between the exhaust gas pressure at the inflow side of the soot filter 40 and the exhaust gas pressure at the outflow side of the soot filter 40 is detected through the differential pressure sensor 44. The residual amount of the particulate matter in the exhaust gas collected by the soot filter 40 is proportional to the differential pressure of the exhaust gas. In view of this, when the amount of the particulate matter residual in the soot filter 40 increases to or over a predetermined amount, regeneration control (for example, control to raise the exhaust temperature) is executed to reduce the amount of the particulate matter in the soot filter 40 based on a result of the detection by the differential pressure sensor 44. When the amount of the particulate matter residual further increases to or over a regeneration controllable range, the exhaust gas purification casing 38 may be detached and disassembled to conduct manual maintenance of cleaning the soot filter 40 and removing the particulate matter.

An electrical wiring connector 51 is integrally disposed on an outer case portion of the differential pressure sensor 44. Also, an electrical wiring connector 52 of the upstream-side gas temperature sensor 42, and an electrical wiring connector 53 of the downstream-side gas temperature sensor 43 are fixed to the sensor bracket 46. The electrical wiring connector 51 of the differential pressure sensor 44, the electrical wiring connector 52 of the upstream-side gas temperature sensor 42, and the electrical wiring connector 53 of the downstream-side gas temperature sensor 43 are supported with these electrical wiring connectors 51, 52, and 53 being in such postures that the electrical wiring connectors 51, 52, and 53 are oriented in the same connection direction. This improves connection workability of the electrical wiring connectors 51, 52, and 53.

Further, a hanging body 55 is integrally formed with the exit holding flange 45 of the exhaust gas purification casing 38, and a hanging fitting 56 is fastened using a bolt to the exhaust gas purification casing 38 on a side surface of the exhaust gas purification casing 38 at an exhaust gas intake side of the purification inlet pipe 36. The hanging body 55 and the hanging fitting 56 are spaced from each other along a diagonal direction of the exhaust gas purification casing 38, In an assembling factory for the diesel engine 1, the hanging body 55 and the hanging fitting 56 are caused to engage hooks (not shown) of a chain block such that the chain block hangs and supports the exhaust gas purification casing 38. Subsequently, the exhaust gas purification casing 38 is assembled to the diesel engine 1. The arrangement of the hanging body 55 and the hanging fitting 56 in the diagonal direction ensures that the exhaust gas purification casing 38, which is a heavy load, is hanged in a stable posture.

As shown in FIGS. 1 and 8 to 10, then, an EGR gas take-out pipe 61 is integrally formed with the exhaust manifold 7. Further, a pipe joint member 62 is fastened using a bolt to the exhaust manifold 7. An EGR cooler 29 has an EGR gas inlet portion that is supported by the EGR gas take-out pipe 61. Also, the pipe joint member 62, by which the recirculation exhaust gas pipe 30 is coupled, supports an EGR gas exit portion of the EGR cooler 29. This ensures that the EGR cooler 29 is disposed at a distance from the cylinder block 4 (specifically, from left side of the cylinder block 4).

Meanwhile, as shown in FIGS. 1, 8, and 12 to 14, the diesel engine 1 includes an exhaust gas throttle device 65 to increase the exhaust gas pressure of the engine. The exhaust manifold 7 has an exhaust gas exit body 7a, which is open upward. The exhaust gas exit body 7a of the exhaust manifold 7 is detachably coupled to an elbow-shaped relay pipe 66 through the exhaust gas throttle device 65, which is for regulating the exhaust gas pressure of the diesel engine 1. The exhaust gas throttle device 65 includes a throttle valve easing 68, an actuator casing 69, and a water cooling casing 70. The throttle valve casing 68 accommodates an exhaust gas throttle valve 67. The actuator casing 69 controls the exhaust gas throttle valve 67 open. Through the water cooling casing 70, the actuator casing 69 is coupled to the throttle valve casing 68.

The throttle valve casing 68 is mounted on the exhaust gas exit body 7a, and the relay pipe 66 is mounted on the throttle valve casing 68. Then, the relay pipe 66 is fastened using four bolts 71 to the exhaust gas exit body 7a through the throttle valve casing 68. A lower surface side of the throttle valve casing 68 is fixed to the exhaust gas exit body 7a. The relay pipe 66 has a lower side opening portion 66a fixed to an upper surface side of the throttle valve casing 68. The relay pipe 66 has a laterally oriented opening portion 66b, which is coupled to the purification inlet pipe 36 through an exhaust pipe 72. Thus, the exhaust manifold 7 is coupled to the exhaust gas purifier 2 through the relay pipe 66 and the exhaust gas throttle device 65. Exhaust gas is discharged from an exit portion of the exhaust manifold 7 and moves into the exhaust gas purifier 2 through the purification inlet pipe 36 to be purified in the exhaust gas purifier 2. Then, the exhaust gas passes through the purification exit pipe 37 to a tail pipe (not shown) to be finally discharged to the outside.

The above-described configuration ensures that an actuator (not shown) of the exhaust gas throttle device 65 is actuated based on the pressure difference detected by the differential pressure sensor 44, which causes regeneration control of the soot filter 40 to be executed. That is, when soot is accumulated in the soot filter 40, the exhaust gas throttle valve 67 of the exhaust gas throttle device 65 is controlled into closed state. This increases the exhaust gas pressure of the diesel engine 1 and raises the temperature of the exhaust gas discharged from the diesel engine 1, thereby combusting the soot accumulated in the soot filter 40. As a result, the soot is eliminated and the soot filter 40 is regenerated.

Further, even if continuous work (work with increasing likelihood of soot accumulation), in which a load is low and the temperature of exhaust gas is likely to be low, is performed, the exhaust gas throttle device 65 forcedly increases the exhaust gas pressure. This enables the regeneration of the soot filter 40 such that the exhaust gas purifier 2 can properly sustain an exhaust gas purifying capability. Furthermore, no burner or the like is necessitated to combust soot accumulated in the soot filter 40. Even during startup of the engine 1, moreover, controlling the exhaust gas throttle device 65 enables the exhaust gas pressure of the diesel engine 1 to increase. This raises the temperature of exhaust gas from the diesel engine 1 to a high temperature, promoting the warm up of the diesel engine 1.

As shown in FIGS. 1, 8, and 12 to 14, the engine apparatus includes the engine 1 including the exhaust manifold 7, and the exhaust gas throttle device 65 adjusts the exhaust gas pressure of the exhaust manifold 7. The exhaust gas intake side of the throttle valve casing 68 of the exhaust gas throttle device 65 is fastened to the exhaust as exit of the exhaust manifold 7, and the exhaust pipe 72 is coupled to the exhaust manifold 7 through the throttle valve casing 68. Accordingly, the exhaust gas throttle device 65 is supported on the exhaust manifold 7 with increased rigidity, and the support structure of the exhaust gas throttle device 65 has high rigidity. At the same time, the volume of the exhaust gas intake side of the exhaust gas throttle device 65 is reduced, which ensures highly accurate adjustment of the exhaust gas pressure of the exhaust manifold 7 as compared with, for example, a structure in which the throttle valve casing 68 is coupled to the exhaust manifold 7 through the relay pipe 66. For example, the temperature of exhaust gas supplied to the exhaust gas purifier 2 is readily maintained at a proper temperature for purification of exhaust gas.

As shown in FIG. 8 and FIGS. 12 to 14, the throttle valve casing 68 is fastened to the top surface side of the exhaust manifold 7, and the relay pipe 66 is fastened to the top surface side of the throttle valve casing 68. The throttle valve casing 68 and the relay pipe 66 are disposed in multiple layers with respect to the exhaust manifold 7, and the exhaust pipe 72 is coupled to the relay pipe 66 placed in the uppermost area. This makes the mounting posture (the coupling direction of the exhaust manifold 72) of the relay pipe 66 variable in association with the mounting position or another position of the exhaust gas purifier 2, for example. This is achieved without changing the supporting posture of the exhaust gas throttle device 65 nor changing the specifications of the relay pipe 66.

As shown in FIG. 8 and FIGS. 12 to 14, the throttle valve casing 68 is fastened to the top surface side of the exhaust manifold 7, and the relay pipe 66 is fastened to the top surface side of the throttle valve casing 68. The throttle valve casing 68 and the relay pipe 66 are disposed in multiple layers with respect to the exhaust manifold 7, and the exhaust pipe 72 is coupled to the relay pipe 66 placed in the uppermost area. This makes the mounting posture (the coupling direction of the exhaust pipe 72) of the relay pipe 66 variable in association with the mounting position or another position of the exhaust gas purifier 2, for example. This is achieved without changing the supporting posture ofthe exhaust gas throttle device 65 nor changing the specifications of the relay pipe 66.

As shown in FIGS. 1 and 8 and FIGS. 12 to 14, the exhaust gas exit of the exhaust manifold 7 is open upward, and the throttle valve casing 68 is disposed on the top surface side of the exhaust manifold 7. The throttle valve gas exit is formed on the top surface side of the throttle valve casing 68, and the EGR cooler 29 is disposed below the throttle valve casing 68 across the exhaust manifold 7. Thus, the exhaust manifold 7, the exhaust gas throttle device 65, and the EGR cooler 29 are positioned in a compact manner along one side of the diesel engine 1 At the same time, the exhaust pipe 72 is laterally or upwardly extendable from the throttle valve gas exit of the throttle valve casing 68 in association with, for example, the layout of the exhaust gas purifier 2. Consequently, the exhaust gas purifier 2 is functionally supported inside or outside an engine room (by component parts except for the diesel engine 1) of the working vehicle. Moreover, utilizing the outer side surface of the exhaust manifold 7 ensures compact support of the cooling water tubing (such as a throttle exit hose 77 and a throttle inlet hose 78) coupled to the exhaust gas throttle device 65 and the EGR cooler 29.

Meanwhile, a cooling water flow path (such as a flexible cooling water return hose 75, a throttle exit hose 77, a throttle inlet hose 78, and a cooling water exit hose 79) is disposed on the left side (on a side closer to the exhaust manifold 7) of the diesel engine 1. The cooling water flow path couples the cooling water pump 21 to the EGR cooler 29 and the exhaust gas throttle device 65. Cooling water from the cooling water pump 21 is not only supplied to a water cooling portion of the diesel engine 1 but also supplied in part to the EGR cooler 29 and the exhaust gas throttle device 65.

The alloy-based intermediate pipe 76 has one end coupled to the return hose 75 and the other end coupled to one side of the flexible throttle exit hose 77. The other end of the flexible throttle exit hose 77 is coupled to a water cooling casing 70 of the exhaust gas throttle device 65. One end of a throttle inlet hose 78 is coupled to the water cooling casing 70, and the other end of the throttle inlet hose 78 is coupled to a cooling water discharge port of the EGR cooler 29. In addition, the EGR cooler 29 has a cooling water inlet port coupled to the cylinder block 4 through the cooling water exit hose 79.

That is, the EGR cooler 29 and the exhaust gas throttle device 65 are coupled to the cooling water pump 21 in series. The exhaust gas throttle device 65 is placed in the cooling water flow path that includes the respective hoses 75, 77, 78 and 79 extending between the cooling water pump 21 and the EGR cooler 29. The exhaust gas throttle device 65 is positioned at an upstream side of the cooling water pump 21. Cooling water from the cooling water pump 21 is supplied in part from the cylinder block 4 to the exhaust gas throttle device 65 through the EGR cooler 29 for recirculation.

As shown in FIGS. 1, 3, and 8 to 10, the engine apparatus includes: the intake manifold 6 and the exhaust manifold 7; the EGR cooler 29, which cools EGR gas recirculated from the exhaust manifold 7 to the intake manifold 6; and the exhaust gas pressure sensor 84, which detects the pressure of exhaust gas in the exhaust manifold 7. The exhaust manifold 7 has a heat-conducting exhaust gas pressure sensor pipe 85, by which an exhaust gas pressure sensor 84 is coupled. The exhaust gas pressure sensor pipe 85 is disposed in parallel to the intermediate pipe 76, which serves as a cooling water pipe through which cooling water is recirculated to the EGR cooler 29. Thus, arranging the cooling water pipe 76 and the exhaust gas pressure sensor pipe 85 side by side with each other suppresses an increase in the temperature of the exhaust gas pressure sensor pipe 85, which is subject to heat of exhaust gas. This improves durability of connection parts (such as the exhaust gas pressure hose 86) such as flexible rubber hose. At the same time, the exhaust gas pressure sensor 84 is placed adjacent to the pressure take-out port 83 of the exhaust manifold 7, and the exhaust gas pressure sensor pipe 85 is shortened in length. This enables the simplification of the exhaust gas pressure sensor pipe 85 or a shock-proofing structure of the connection parts.

Figure 8:
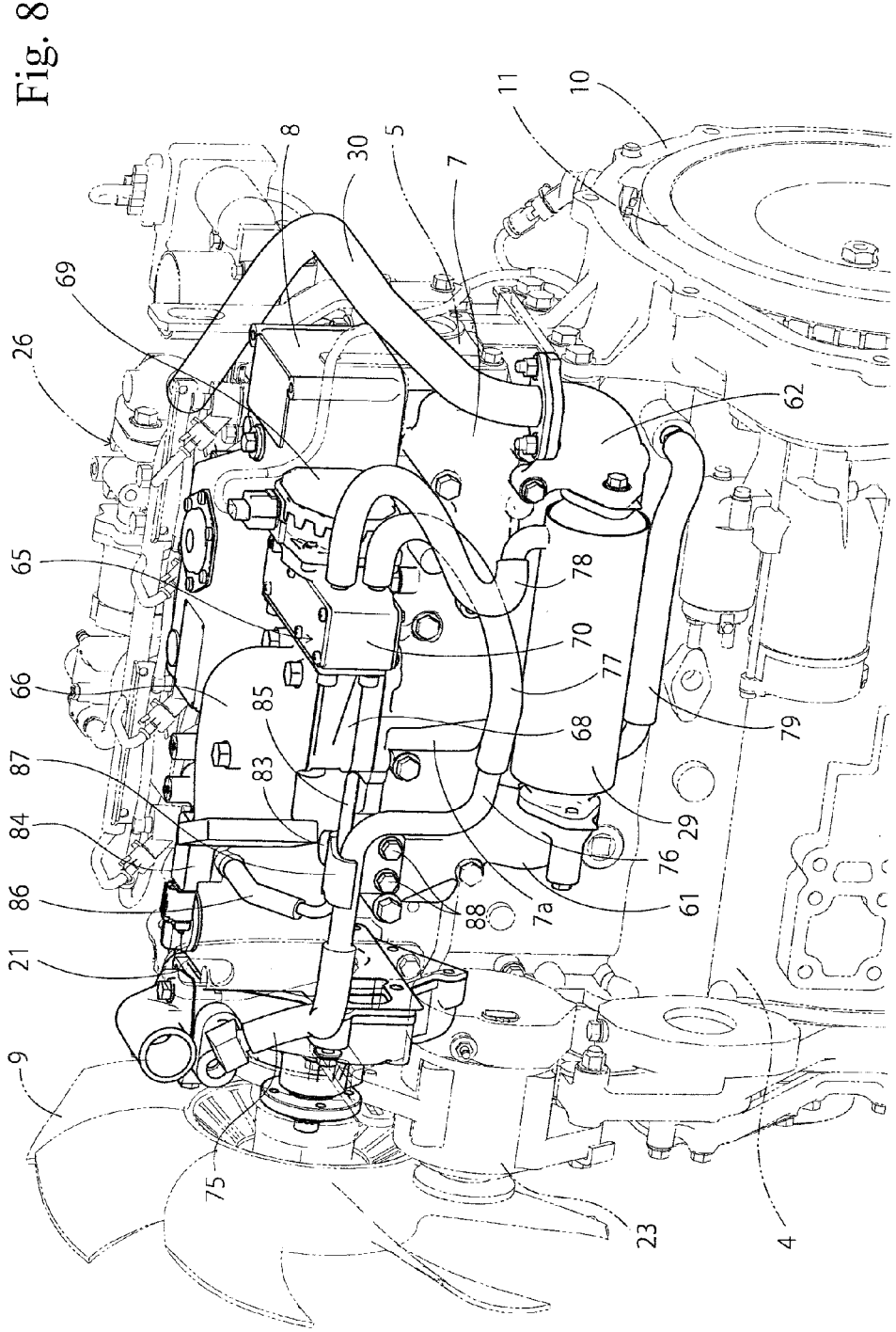
FIG. 8 is a perspective view of the diesel engine as viewed in a right side of an exhaust manifold portion.
Figure 9:
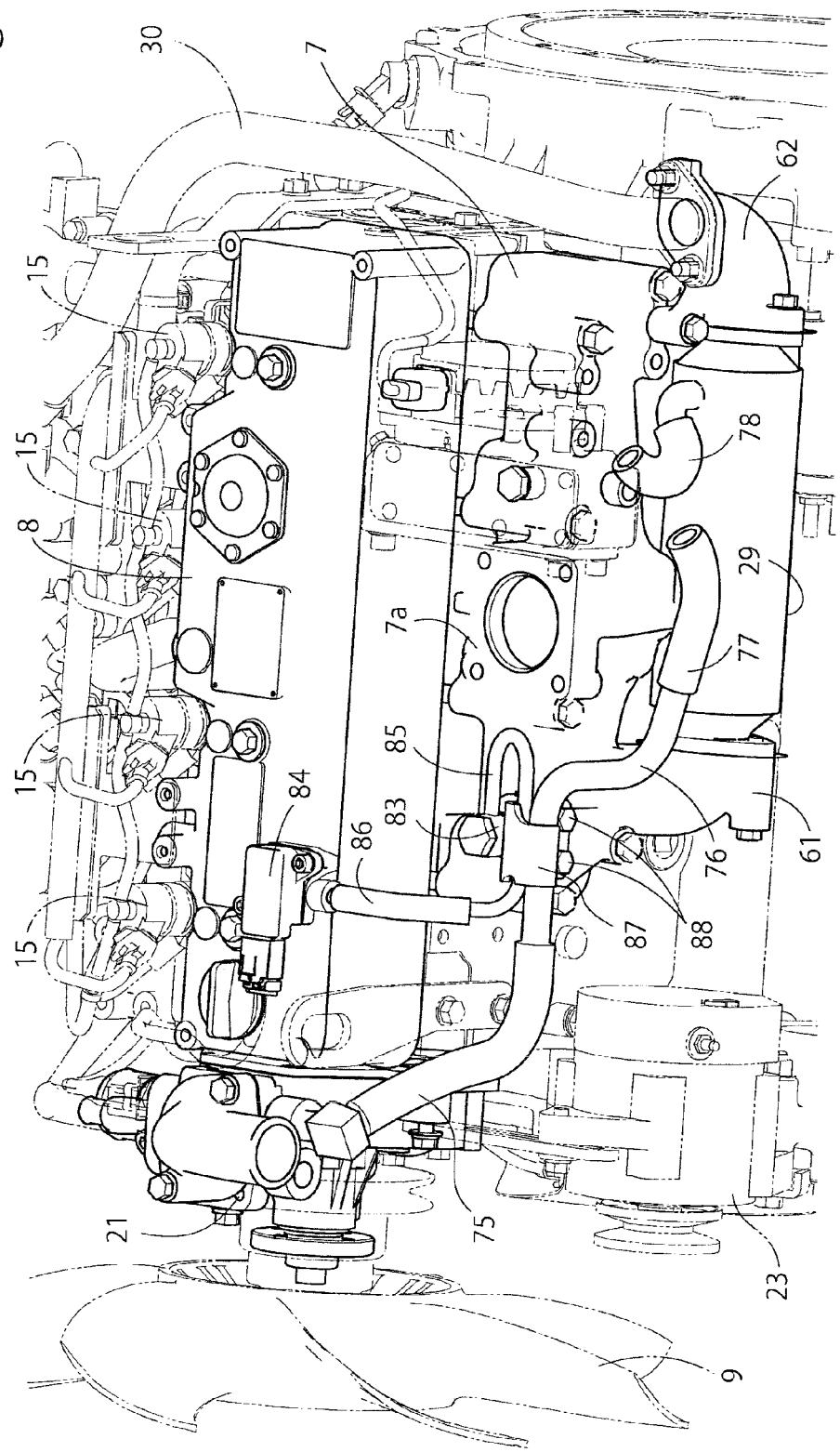
FIG. 9 is a perspective view of the diesel engine as viewed from a top surface side of the exhaust manifold portion.
Figure 10:
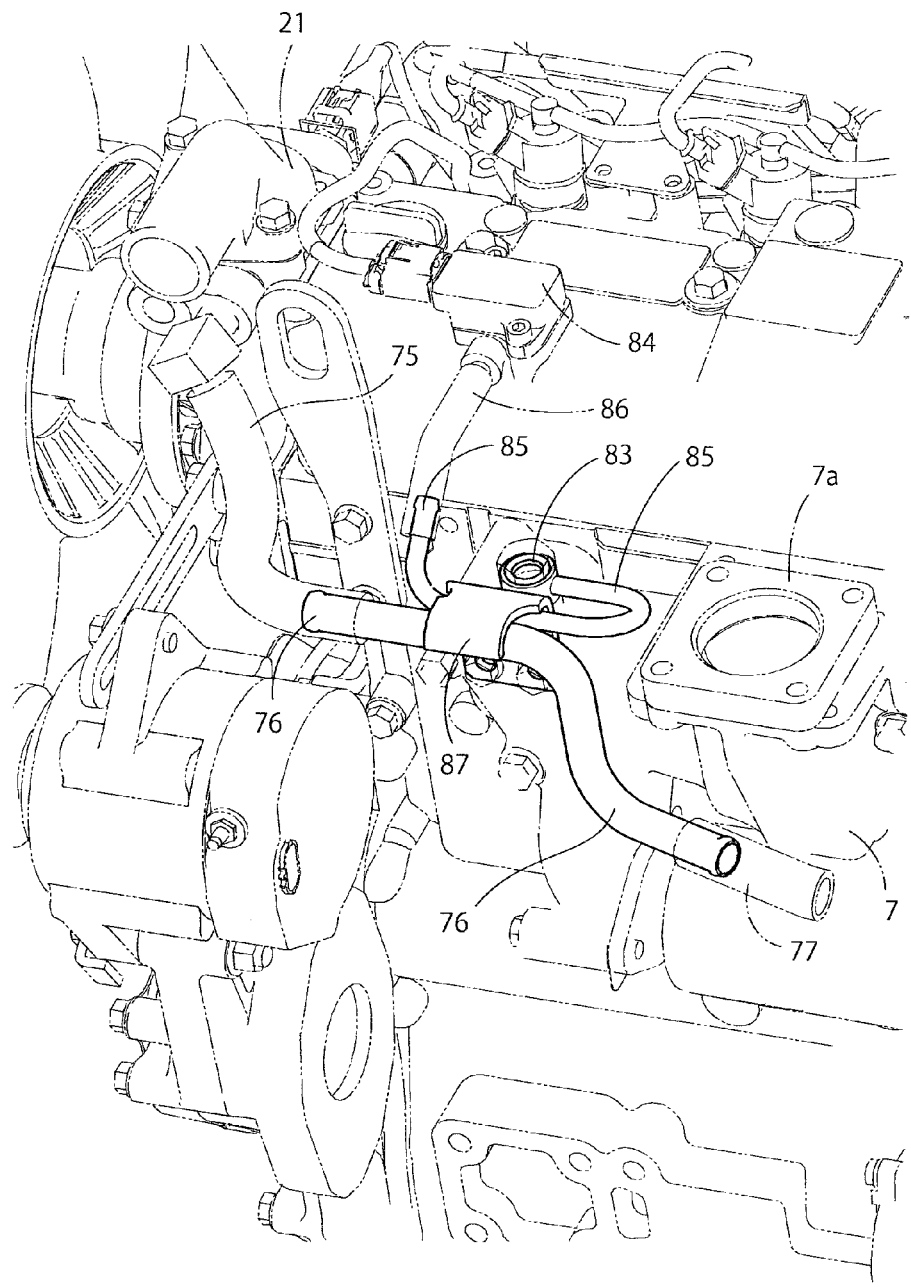
FIG. 10 is a perspective view of a cooling water pipe.

As shown in FIGS. 8 to 10, a pipe supporting bracket 87 is secured to the exhaust manifold 7, and the intermediate pipe 76 and the exhaust gas pressure sensor pipe 85 are secured to the pipe supporting bracket 87. Thus, the intermediate pipe 76, the exhaust gas pressure sensor pipe 85, and the pipe supporting bracket 87 are formed into a single component to be assembled to the diesel engine 1. At the same time, the intermediate pipe 76 and the exhaust gas pressure sensor pipe 85 are firmly secured to the exhaust manifold 7 of increased rigidity through the pipe supporting bracket 87. This simplifies the vibration-proof structure of the intermediate pipe 76 and the exhaust gas pressure sensor pipe 85.

As shown in FIGS. 1, 3, and 8 to 10, the EGR gas take-out pipe 61 is integrally formed with the exhaust manifold 7, and the EGR gas take-out pipe 61 protrudes obliquely downward in the outward direction from the exhaust manifold 7. One side portion of the EGR cooler 29 is coupled to a protruding end of the EGR gas take-out pipe 61, and the pipe joint member 62 is formed on the other end of the EGR cooler 29. The other end of the EGR cooler 29 is coupled to the exhaust manifold 7 through the pipe joint member 62. The intermediate pipe 76 extends upward of the EGR cooler 29 in an area outside the exhaust manifold 7. This reduces the number of supporting parts supporting the EGR cooler 29 at a distance from the side surface of the diesel engine 1, resulting in a reduction in production cost. At the same time, the intermediate pipe 76 is placed adjacent to the pressure take-out port 83 (at the mounting position of the exhaust gas pressure sensor pipe 85) of the exhaust manifold 7. The intermediate pipe 76 or the exhaust gas pressure sensor pipe 85 is supported in an area further inward than the outer side surface of, for example, the EGR cooler 29. The intermediate pipe 76 or the exhaust gas pressure sensor pipe 85 has no likelihood of protruding from the side surface of the diesel engine 1. The intermediate pipe 76 or the exhaust gas pressure sensor pipe 85 is placed adjacent to the side surface of the diesel engine 1 in a compact manner.

DESCRIPTION OF THE REFERENCE NUMERAL

1 Diesel Engine
6 Intake manifold
7 Exhaust manifold
29 EGR cooler
61 EGR gas take-out pipe
62 Pipe joint member
65 Exhaust gas throttle device
66 Relay pipe
68 Throttle valve easing
76 Intermediate pipe (cooling water pipe)
84 Exhaust gas pressure sensor
85 Exhaust gas pressure sensor pipe
87 Pipe supporting bracket

The invention claimed is:
1. An engine apparatus comprising;
an engine including an exhaust manifold;
an exhaust gas throttle device configured to adjust an exhaust gas pressure of the exhaust manifold;
an exhaust gas pressure sensor configured to detect the exhaust gas pressure at the exhaust manifold; and
a heat-conducting exhaust gas pressure sensor pipe configured to couple the exhaust gas pressure sensor to the exhaust manifold;
wherein an exhaust gas intake side of a throttle valve casing of the exhaust gas throttle device is fastened to an exhaust gas exit of the exhaust manifold, and an exhaust pipe is coupled to the exhaust manifold through the throttle valve casing;
wherein the exhaust gas exit of the exhaust manifold is open upward;
wherein the throttle valve casing is disposed on an upper surface side of the exhaust manifold;
wherein an upper surface side of the throttle valve casing is formed with a throttle valve gas exit;
wherein an EGR cooler configured to cool EGR gas is disposed below the throttle valve casing across the exhaust manifold; and
wherein a cooling water pump through which a cooling water is circulated to the EGR cooler is disposed in parallel to the exhaust gas pressure sensor pipe.

2. The engine apparatus according to claim 1, wherein the throttle valve casing is coupled to an upper surface side of the exhaust manifold, wherein a relay pipe is coupled an upper surface side of the throttle valve casing, wherein the throttle valve casing and the relay pipe are placed in multiple layers with respect to the exhaust manifold, and wherein the exhaust pipe is coupled to the relay pipe at an uppermost layer portion.

3. The engine apparatus according to claim 1, wherein a pipe supporting bracket is secured to the exhaust manifold, and the cooling water pipe and the exhaust gas pressure sensor pipe are secured to the pipe supporting bracket.

4. The engine apparatus according to claim 1, wherein an EGR gas take-out pipe is integrally formed with the exhaust manifold such that the EGR gas take-out pipe protrudes obliquely downward in an outward direction from the exhaust manifold, wherein one side portion of the EGR cooler is coupled to a protruding end portion of the EGR gas take-out pipe, wherein a pipe joint member is disposed at another side portion of the EGR cooler, wherein the other side portion of the EGR cooler is coupled to the exhaust manifold through the pipe joint member, and wherein the cooling water pipe extends above the EGR cooler at an outside of the exhaust manifold.

* * * * *